United States Patent
Shih et al.

(10) Patent No.: US 7,768,547 B2
(45) Date of Patent: Aug. 3, 2010

(54) MONITORING SYSTEM AND METHOD THEREOF

(75) Inventors: Chi-Hsien Shih, Jhonghe (TW); Shou-Kang Wei, Jhonghe (TW); Chien-Fa Chen, Jhonghe (TW); Mao-Cheng Wu, Jhonghe (TW); Hsi-Tsung Cheng, Jhonghe (TW)

(73) Assignee: Avermedia Information, Inc., Chung-Ho, Taipei Hsien (TW)

( * ) Notice: Subject to any disclaimer, the term of this patent is extended or adjusted under 35 U.S.C. 154(b) by 1314 days.

(21) Appl. No.: 11/260,213

(22) Filed: Oct. 28, 2005

(65) Prior Publication Data

US 2006/0274150 A1    Dec. 7, 2006

(30) Foreign Application Priority Data

Jun. 7, 2005    (TW) ............................. 94118819 A

(51) Int. Cl.
*H04N 7/18* (2006.01)
*H04N 7/16* (2006.01)

(52) U.S. Cl. ...................... 348/143; 725/138

(58) Field of Classification Search ................ 348/143, 348/153, 335, 14.01, 342, 14.12, 14.08, 484, 348/358.1, 426.1, 473; 725/126, 138, 87, 725/144, 93; 715/719; 375/240.18; 600/431, 600/411, 407
See application file for complete search history.

(56) References Cited

U.S. PATENT DOCUMENTS

| 5,724,091 A | * | 3/1998 | Freeman et al. ............. 725/138 |
| 2003/0097660 A1 | | 5/2003 | Bartolotta et al. ........... 725/105 |
| 2004/0155963 A1 | | 8/2004 | Kondo et al. ................. 348/180 |

FOREIGN PATENT DOCUMENTS

| EP | 0 957 633 | 11/1999 |
| GB | 2 413 229 | 10/2005 |

* cited by examiner

*Primary Examiner*—Saeid Ebrahimi Dehkordy
(74) *Attorney, Agent, or Firm*—Bacon & Thomas, PLLC

(57) ABSTRACT

A monitoring system including N cameras, a digital video recorder (DVR), a monitor, a remote controller, a receiver and a host is provided. N is a positive integer. The N cameras successively shoot N sceneries, and output N successive images accordingly. The DVR receives and stores the N successive images. The monitor displays a monitoring screen. The remote controller outputs a wireless remote signal. The receiver receives the wireless remote signal and outputs a wire transmit signal accordingly. The host controls the monitor to display at least the successive image in the monitoring screen. The host has an on screen display (OSD) program. When the controller receives the wire transmit signal, the host utilizes the OSD program to process the wire transmit signal to become a screen adjusting signal. The host adjusts the monitoring screen according to the screen adjusting signal.

11 Claims, 5 Drawing Sheets

MONITORING SYSTEM AND METHOD THEREOF

This application claims the benefit of Taiwan application Serial No. 94118819, filed Jun. 7, 2005, the subject matter of which is incorporated herein by reference.

BACKGROUND OF THE INVENTION

1. Field of the Invention

The invention relates in general to a monitoring system and method thereof, and more particularly to a monitoring system and method thereof using a remote controller to adjust a monitoring screen.

2. Description of the Related Art

Living in modern times when science and technology advance rapidly, the monitoring system has become a necessity to the security of people's life. The monitoring system normally employs several cameras to successfully shoot the sceneries and then employs a digital video recorder (DVR) to receive the images successfully shot by the cameras. The DVR uses digital technology to process the compression and decompression of images, not only prolonging the recording time but also resolving the problem of having decayed signals in the video tape. Besides, when a video tape is to be played back, the user can search for the shots according to parameters such as date, time, camera, warning records and so on. The motion detecting function of the DVR in particularity can ascertain the precision in security by setting a motion detecting area for a predetermined camera. The DVR can be further linked to the Internet so that digital image signals can be transmitted via the Internet. The user can achieve an instant monitoring at a remote end by a computer browser. All settings and operations are the same as if the user were using a host computer, so that the user can instantly grip the information with regards to the security at selected spots.

A conventional monitoring system includes several cameras, a DVR, a computer, a monitor, a mouse and a keyboard. The computer can retrieve the successive images shot by the camera from the DVR and control the monitor to display the successive images in the monitoring screen. Besides, the user can use the mouse or the keyboard to adjust the size, brightness, contrast or color of the monitoring screen or switch the monitoring screen to display the successive images shot by different cameras. Therefore, when the user is not using the mouse and the keyboard, the user would store them up lest the user's line-of-sight might be blocked when viewing the monitor.

However, when the user would like to adjust the monitoring screen, the user has to reach the keyboard and the mouse before the user can use the keyboard and the mouse to adjust the monitoring screen. So, the adjustment of the monitoring screen is subject to the restriction of space. The user may even be unable to locate the misplaced keyboard and mouse. The conventional monitoring system can not provide the user with the convenience of adjusting the monitoring screen wherever and whenever they feel like to, largely reducing the practicality of the monitoring system.

SUMMARY OF THE INVENTION

It is therefore an object of the invention to provide a monitoring system and method thereof. Unlike the conventional design which requires the user to get close to operate conventional keyboard and mouse when adjusting the monitoring screen, the design of adjusting the monitoring screen by a remote controller enables the user to adjust and monitor the screen whenever and wherever it is necessary, largely increasing the practicality of the monitoring system.

The invention achieves the above-identified object by providing a monitoring system. The monitoring system includes N cameras, a digital video recorder (DVR), a monitor, a remote controller, a receiver and a host. N is a positive integer. The N cameras are for successively shooting N sceneries, and then outputting N successive images correspondingly. The DVR electrically connected to the N cameras is for receiving and storing the N successive images. The monitor is for displaying a monitoring screen. The remote controller is for outputting a wireless remote signal. The receiver is for receiving the wireless remote signal and then outputting a wire transmit signal accordingly. The host is electrically connected to the display, the receiver and the DVR for controlling the monitor to display at least a successive image in the monitoring screen. The host has an on screen display (OSD) program. When the host receives the wire transmit signal, the host utilizes the OSD program to process the wire transmit signal to become a screen adjusting signal. Besides, the host adjusts the monitoring screen according to the screen adjusting signal.

The invention achieves the above-identified object by providing a monitoring method. Firstly, N sceneries are successfully shot, and then N successive images are outputted accordingly. N is a positive integer. Next, N successive images are received and stored. Then, at least the successive image is displayed in a monitoring screen. Next, a wireless remote signal is outputted. Then, the wireless remote signal is received, and then a wire transmit signal is outputted accordingly. Next, the wire transmit signal is received and processed to become a screen adjusting signal. Then, the monitoring screen is adjusted according to the screen adjusting signal.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1A:
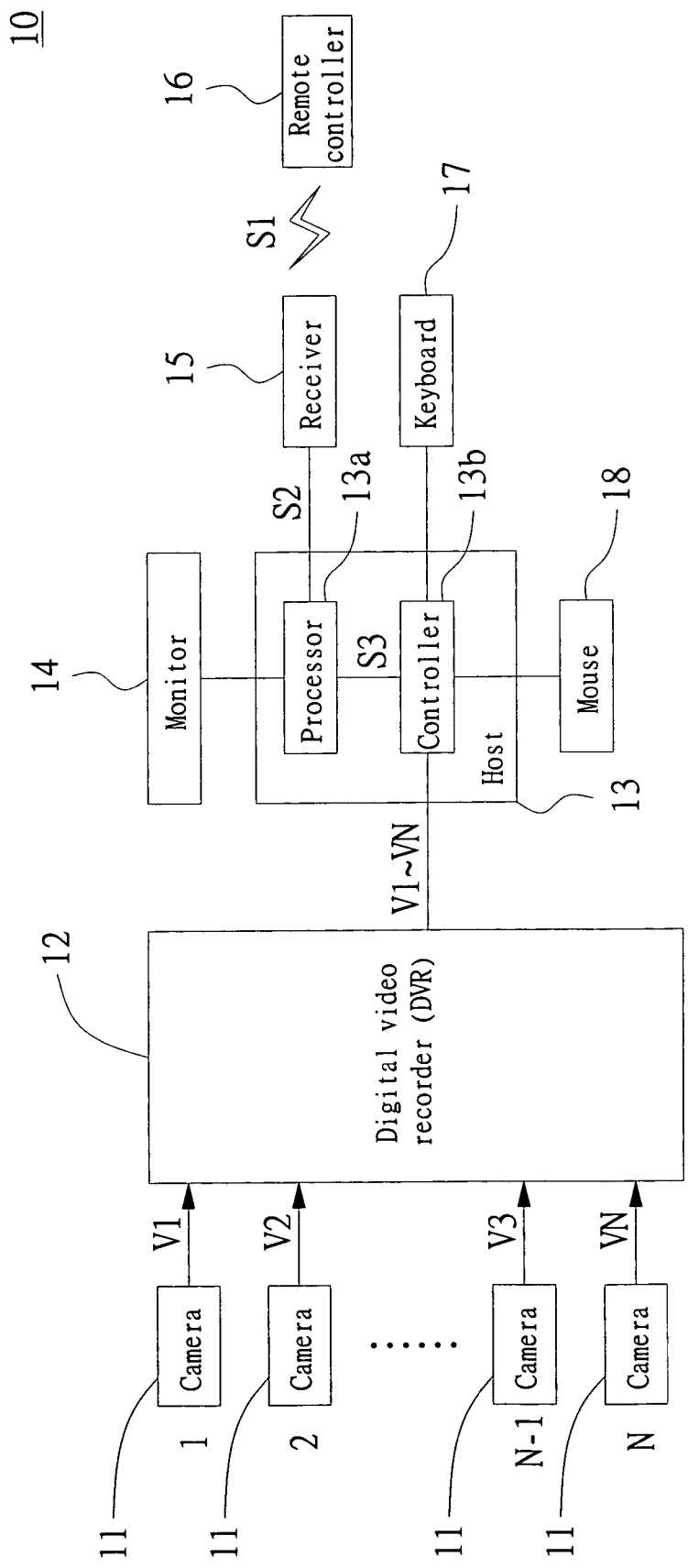
FIG. 1A is a structural diagram of a monitoring system according to a first embodiment of the invention.
Figure 1B:
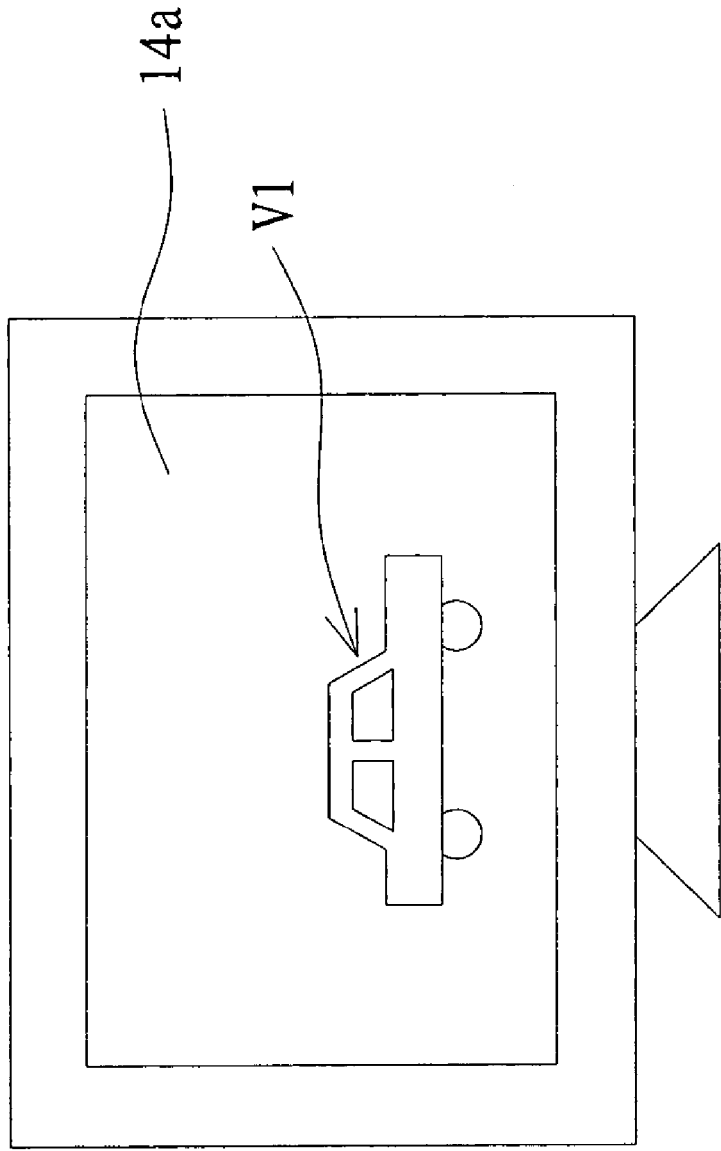
FIG. 1B is a diagram illustrating a monitor in FIG. 1A displaying successive images in a monitoring screen.

Referring to FIG. 1A, a structural diagram of a monitoring system according to a first embodiment of the invention is shown. In FIG. 1A, the monitoring system 10 includes at least a camera 11, a digital video recorder (DVR) 12, a monitor 14, a remote controller 16, a receiver 15 and a host 13. The present embodiment is exemplified by N cameras 11. N is a positive integer. The N cameras 11 are for successively shooting N sceneries, and then outputting N successive images V1~VN to the DVR 12 correspondingly. The DVR 12 is electrically connected to N cameras 11 for receiving and storing the N successive images V1~VN outputted from the N cameras 11. The host 13 is electrically connected to the DVR 12, the monitor 14 and the receiver 15 for retrieving at least a successive image of the N successive images V1~VN from the DVR 12. For example, the host 13 retrieves a successive image V1 form the DVR 12. Besides, as shown in FIG. 1B, the host 13 controls the monitor 14 to display at least a successive image V1 in the monitoring screen 14a.

The remote controller 16 is operated by a user to output a wireless remote signal S1 to the host 13. The receiver 15 is for receiving the wireless remote signal S1 and then outputting a wire transmit signal S2 accordingly. The host 13 has an on screen display (OSD) program. When the host 13 receives the wire transmit signal S2, the host 13 utilizes the OSD program to process the wire transmit signal S2 to become a screen adjusting signal S3. Besides, the host 13 adjusts the monitoring screen 14a of the monitor 14 in FIG. 1B according to the screen adjusting signal S3.

As for how the host 13 adjusts the monitoring screen 14a according to the wire transmit signal S2 is disclosed below.

In the present embodiment, the host 13 includes a controller 13b and a processor 13a. The processor 13a receives and processes the wire transmit signal S2 to become and output a screen adjusting signal S3. The controller 13b is electrically connected to the DVR 12. The processor 13a is for controlling the monitor 14 to display at least a successive image, such as a successive image V1 for instance, in the monitoring screen 14a. The controller 13b receives the wire transmit signal S2 and adjusts the monitoring screen 14a according to the screen adjusting signal S3. Besides, the processor 13a has the on screen display (OSD) program disclosed above. When the processor 13a receives the wire transmit signal S2, the processor 13a utilizes the OSD program to process the wire transmit signal S2 to become and output the screen adjusting signal S3. Moreover, the processor 13a is electrically connected to the receiver 15 and the monitor 14. The controller 13b controls the monitor 14 via the processor 13a.

When the processor 13a receives the wire transmit signal S2, the processor 13a having the above-disclosed OSD program utilizes the OSD program to process the wire transmit signal S2 to become the screen adjusting signal S3, whereby the monitoring screen 14a can be adjusted directly.

The electrical connection between the processor 13a and the receiver 15 and the monitor 14 and the electrical connection between the controller 13b and the DVR 12 are not limited thereto. For example, the above-disclosed processor 13a can be electrically connected to the receiver 15, the monitor 14 and the DVR 12, while the controller 13b is electrically connected to the DVR 12 and the monitor 14 via the processor 13a. Or, the above-disclosed controller 13b can be electrically connected to the receiver 15 and the DVR 12, while the monitor 14 is electrically connected to the controller 13b via the processor 13a.

Any one who is skilled in the technology of the present embodiment of the invention will understand that the technology of the present embodiment of the invention is not limited thereto. For example, the host 13 can adjust the size, brightness, contrast or color of the monitoring screen 14a according to the wire transmit signal S2. Besides, the host 13 can adjust the monitor 14 to display another successive image, such as a successive image of the successive images V2~VN for instance, in the monitoring screen 14a according to the wire transmit signal S2. Furthermore, the host 13 can control the monitor 14 to display M successive images in the monitoring screen 14a. M is a positive integer smaller than or equal to N. The monitor 14 can be a liquid crystal display (LCD), an organic light emitting diode (OLED) display, a plasma display or an organic electroluminescent device (OELD) display.

It is noteworthy that in FIG. 1A, the monitoring system 10 further includes a computer operating interface such as a keyboard 17 and a mouse 18 for instance. The keyboard 17 and the mouse 18 are electrically connected to the host 13. In the present embodiment, the keyboard 17 and the mouse 18 are electrically connected to the controller 13b. When the user would like to adjust the monitoring screen 14a of the monitor 14, not only can the user adjust the monitoring screen 14a via the remote controller 16, the user can further adjust the monitoring screen 14a via the keyboard 17 and the mouse 18. Thus, the monitoring system 10 of the present embodiment provides the user with an operating medium capable of selectively adjusting the monitoring screen 14a. That is, the user can selectively adjust the monitoring screen 14a via the remote controller 16 or the mouse 18 and the keyboard 17, transcending the restriction imposed in a conventional design that the user can only adjust the monitoring screen via the mouse and the keyboard.

Unlike the conventional design which requires the user to get close to operate conventional keyboard and mouse when adjusting the monitoring screen, the monitoring system of the present embodiment adjusts the monitoring screen by a remote controller, thus enabling the user to adjust and monitor the screen whenever and wherever it is necessary, largely increasing the practicality of the monitoring system.

Second Embodiment

Figure 2:
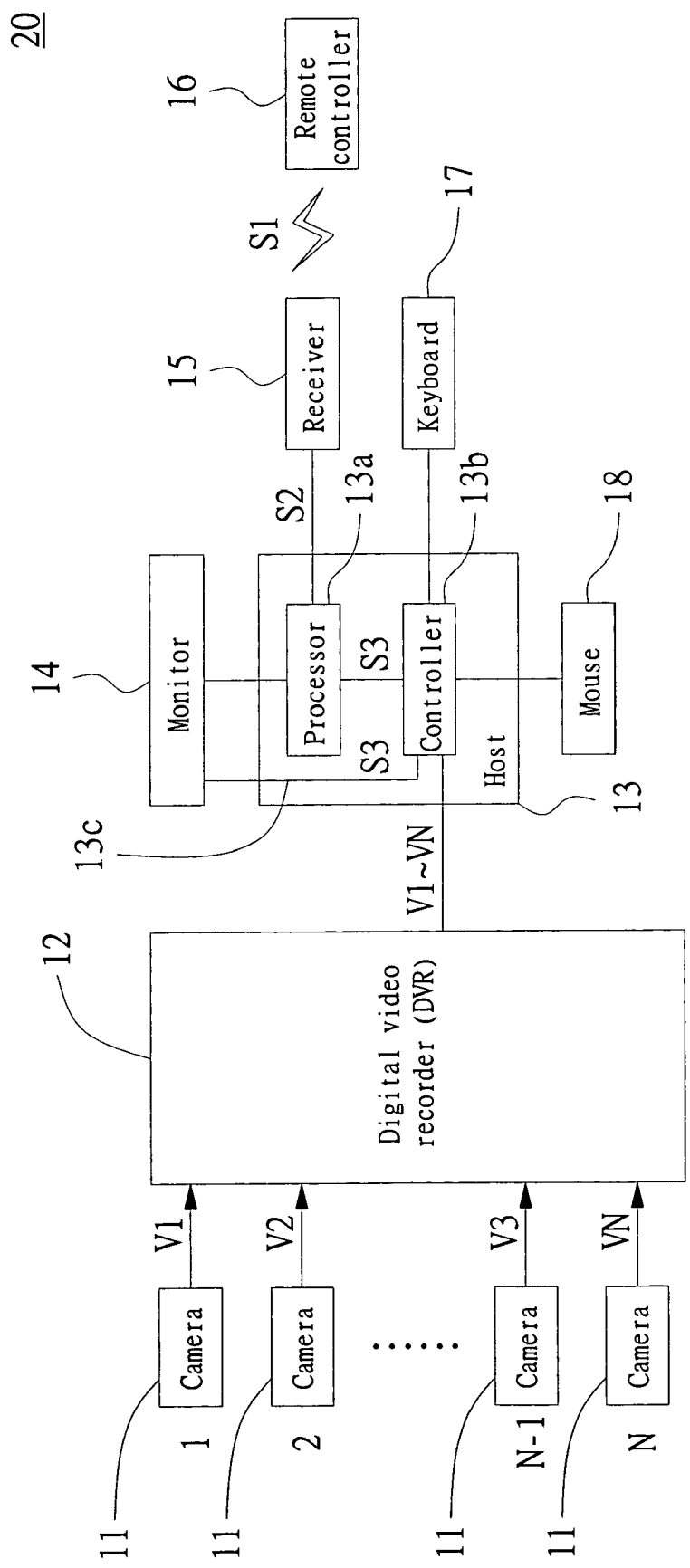
FIG. 2 is a structural diagram of a monitoring system according to a second embodiment of the invention.

Referring to FIG. 2, a structural diagram of a monitoring system according to a second embodiment of the invention is shown. The monitoring system 20 of the present embodiment differs with the monitoring system 10 of the first embodiment in that the controller 13b can control the monitor 14 directly without the processor 13a. As for the same components, the same labels are still used and are not repeated here.

In FIG. 2, the controller 13b bypasses the processor 13a to control the monitor 14 directly. That is, the controller 13b adjusts the monitoring screen 14a via the conducting wire 13c according to the screen adjusting signal S3.

Any one who is skilled in the technology of the present embodiment of the invention will understand that the technology of the present embodiment of the invention is not limited thereto. For example, the above-disclosed processor 13a can be electrically connected to the receiver 15, the monitor 14 and the DVR 12, while the controller 13b is electrically connected to the DVR 12 via the processor 13a. Or, the above-disclosed controller 13b can be electrically connected to the receiver 15 and the DVR 12, while the processor 13a can only be electrically connected to the controller 13b.

Third Embodiment

Figure 3:
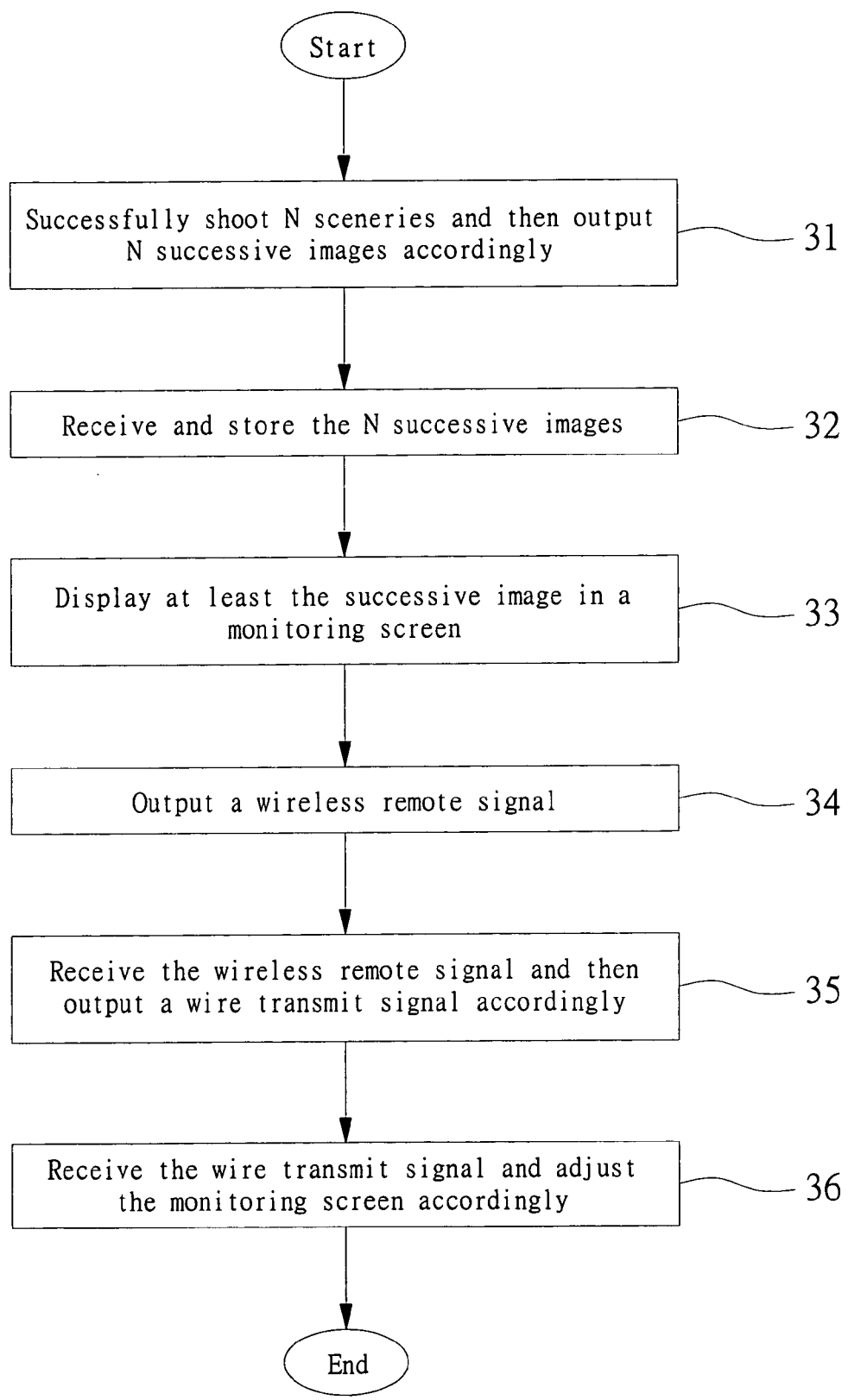
FIG. 3 is a flowchart of a monitoring method according to a third embodiment of the invention.

Referring to FIG. 3, a flowchart of a monitoring method according to a third embodiment of the invention is shown. The monitoring method of the present embodiment applicable to the monitoring system 10 and 20 of the above embodiments is exemplified the monitoring system 10. Referring to both FIGS. 1A~1B, the method begins at step 31, N sceneries are successfully shot by N cameras 11, and then the N successive images V1~VN are outputted to the DVR 12 accordingly. N is a positive integer. Next, proceed to step 32, N successive images V1~VN are received and stored by the DVR 12. Then, proceed to step 33, at least a successive image of the N successive images, such as the successive image V1 for instance, is displayed in a monitoring screen by the monitor 14 as shown in FIG. 1B. Next, proceed to step 34, the remote controller 16 is operated by a user to output a wireless remote signal S1 to the host 13. Then, proceed to step 35, the wireless remote signal S1 is received by the receiver 15 and then a wire transmit signal S2 is outputted to the host 13 accordingly. Next, proceed to step 36, the wire transmit signal S2 is received by the host 13 and then the monitoring screen 14a of the monitor 14 in FIG. 1B is adjusted accordingly.

Figure 4:
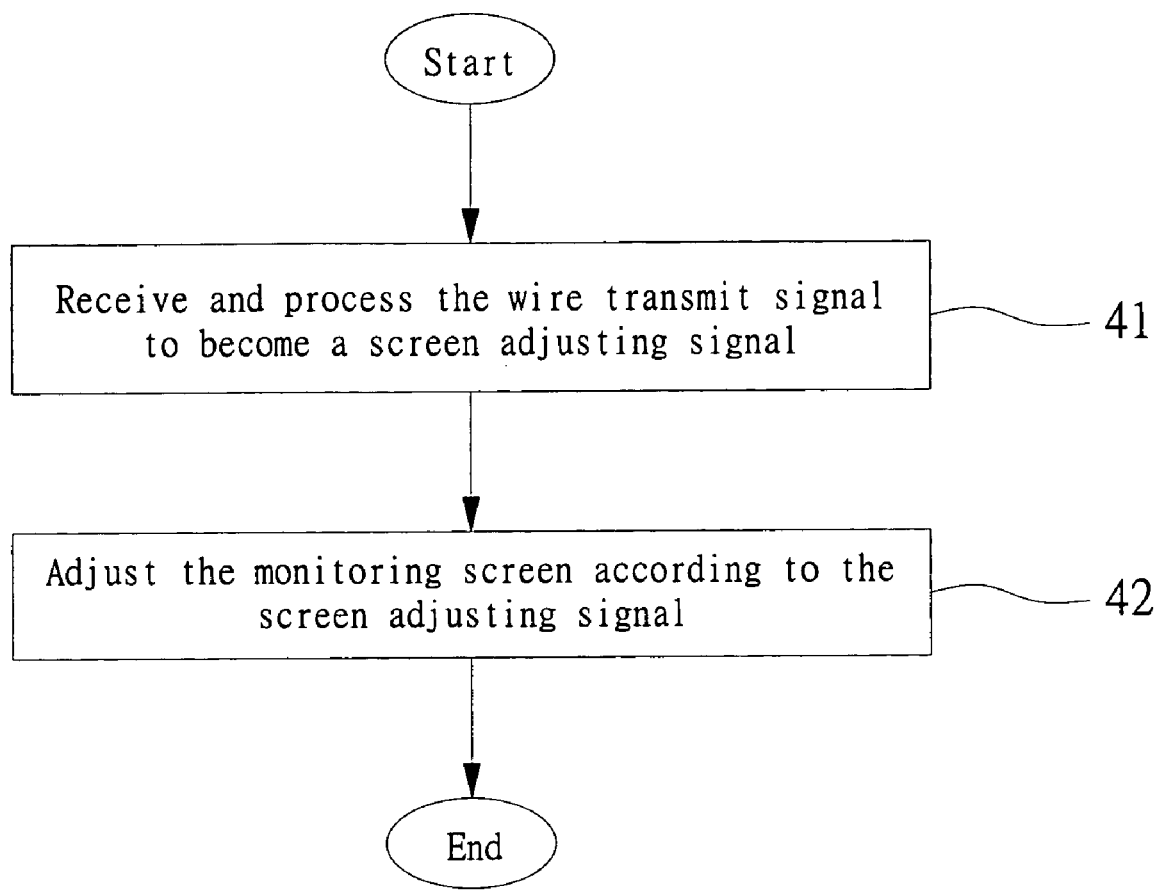
FIG. 4 is a flowchart of the sub-steps pertaining to step 36 in FIG. 3.

Besides, the step 36 of adjusting the monitoring screen 14a further includes several sub-steps as shown in FIG. 4. Firstly, in step 41, the wire transmit signal S2 is received and processed by the processor 13a to become a screen adjusting signal S3. Next, proceed to step 42, the screen adjusting signal is received by the controller 13b and then the monitoring screen of the monitor 14 is adjusted accordingly.

Moreover, during the process of adjusting the monitoring screen 14a in the step 36, the size, brightness, contrast or color of the monitoring screen 14a can be adjusted. During the process of adjusting the monitoring screen 14a in the step 36, another successive image, such as a successive image of the successive images V2~VN for instance, can be displayed in the monitoring screen 14a. During the process of displaying at least a successive image in the step 33, M successive images can be displayed in the monitoring screen 14a. M is a positive integer smaller than or equal to N.

Unlike the conventional design which requires the user to get close to operate conventional keyboard and mouse when adjusting the monitoring screen, the monitoring system and method thereof disclosed in above embodiment of the invention adjusts the monitoring screen by a remote controller, thus enabling the user to adjust and monitor the screen whenever and wherever necessary, largely increasing the practicality of the monitoring system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A monitoring system, comprising:
   N cameras for successively shooting N sceneries and then outputting N successive images correspondingly, wherein N is a positive integer;
   a digital video recorder (DVR) electrically connected to the N cameras for receiving and storing the N successive images;
   a monitor for displaying a monitoring screen;
   a remote controller for outputting a wireless remote signal;
   a receiver for receiving the wireless remote signal and then outputting a wire transmit signal accordingly; and
   a host including a processor having an on screen display (OSD) program and a controller electrically connected to the processor for controlling the monitor to display at least the successive image in the monitoring screen, the OSD program electrically connected to the monitor, the receiver and the DVR for controlling the monitor to display at least the successive image in the monitoring screen, wherein the processor utilizes the OSD program to process the wire transmit signal to become a screen adjusting signal when the processor receives the wire transmit signal, and then outputs the wire transmit signal, and wherein the controller receives the screen adjusting signal and then adjusts the monitoring screen according to the screen adjusting signal.

2. The monitoring system according to claim 1, wherein the processor is electrically connected to the receiver and the monitor, and the controller controls the monitor via the processor.

3. The monitoring system according to claim 1, wherein the processor is electrically connected to the receiver and the monitor, and the controller bypasses the processor so as to control the monitor directly.

4. The monitoring system according to claim 1, wherein the host adjusts the size, brightness, contrast or color of the monitoring screen according to the wire transmit signal.

5. The monitoring system according to claim 1, wherein the host adjusts the monitor to display another successive image in the monitoring screen according to the wire transmit signal.

6. The monitoring system according to claim 1, wherein the host controls the monitor to display the M successive images in the monitoring screen, M is a positive integer smaller than or equal to N.

7. The monitoring system according to claim 1, wherein the monitor can be a liquid crystal display (LCD), an organic light emitting diode (OLED) display, a plasma display or an organic electroluminescent device (OELD) display.

8. The monitoring system according to claim 1, further comprising: a keyboard and a mouse both electrically connected to the host for a user to adjust the monitoring screen.

9. A monitoring system, comprising:
   N cameras for successively shooting N sceneries and then outputting N successive images correspondingly, wherein N is a positive integer;
   a digital video recorder (DVR) electrically connected to the N cameras for receiving and storing the N successive images;
   a monitor for displaying a monitoring screen;
   a remote controller for outputting a wireless remote signal;
   a receiver for receiving the wireless remote signal and then outputting a wire transmit signal accordingly; and
   a host having an on screen display (OSD) program electrically connected to the monitor, the receiver and the DVR for controlling the monitor to display at least the successive image in the monitoring screen, wherein the host utilizes the OSD program to process the wire transmit signal to become a screen adjusting signal when the host receives the wire transmit signal, and then the host adjusts the monitoring screen according to the screen adjusting signal, wherein the host comprises:
   a processor having the OSD program, wherein the processor utilizes the OSD program to process the wire transmit signal to become the screen adjusting signal when the processor receives the wire transmit signal, and then the processor adjusts the monitoring screen according to the wire transmit signal; and
   a controller electrically connected to the processor for controlling the monitor to display at least the successive image in the monitoring screen.

10. The monitoring system according to claim 9, wherein the processor is electrically connected to the receiver and the monitor, and the controller controls the monitor via the processor.

11. The monitoring system according to claim 9, wherein the processor is electrically connected to the receiver and the monitor, and the controller bypasses the processor so as to control the monitor directly.

* * * * *